United States Patent [19]

Sarson

[11] Patent Number: 4,799,512

[45] Date of Patent: Jan. 24, 1989

[54] COUPLING ASSEMBLY

[75] Inventor: Charles R. Sarson, Willoughby Hills, Ohio

[73] Assignee: Tuthill Corporation, Cleveland, Ohio

[21] Appl. No.: 119,853

[22] Filed: Nov. 12, 1987

[51] Int. Cl.$^4$ ............................................. F16L 37/28
[52] U.S. Cl. ............................ 137/614.04; 277/236; 285/226
[58] Field of Search ........... 285/226; 137/614, 614.01, 137/614.04; 251/149.5, 149.6; 277/236, 205, 206 R

[56] References Cited

U.S. PATENT DOCUMENTS

| | | | |
|---|---|---|---|
| 1,586,725 | 6/1926 | Westinghouse et al. | 285/226 |
| 2,272,890 | 2/1942 | Bosomworth | 285/226 |
| 2,904,356 | 9/1959 | Love | 285/226 |
| 3,047,300 | 7/1962 | Taylor et al. | 277/236 |
| 3,112,766 | 12/1963 | Zeliznak et al. | 137/614.05 |
| 3,215,161 | 11/1965 | Goodwin et al. | 137/614.04 |
| 3,567,255 | 3/1971 | Evans | 285/1 |

FOREIGN PATENT DOCUMENTS 243355  5/1968  U.S.S.R. ......................... 137/614.04

Primary Examiner—A. Michael Chambers
Attorney, Agent, or Firm—Tarolli, Sundheim & Covell

[57] ABSTRACT

A coupling assembly includes plug and socket assemblies which are formed entirely of metal to enable them to be used at relatively high temperatures. The plug assembly includes a plug valve assembly which is operable between a closed condition and an open condition. The socket assembly includes a socket body in which there is a chamber for receiving the plug assembly. A socket valve assembly is disposed in and is movable relative to the socket body. The socket valve assembly includes a valve body which is movable relative to the socket body and a valve member which is disposed in the valve body. A leading end portion of the plug assembly includes a surface which applies force against an inner end of the socket valve body to move the socket valve body relative to the socket body and to form a fluid tight seal between the plug assembly and the socket valve body. The plug and socket valve assemblies are operated to an open condition when the plug assembly is inserted into the socket assembly. A second embodiment of the invention includes a bellows which is resiliently deflected and axially compressed as plug and socket assemblies are interconnected.

11 Claims, 5 Drawing Sheets

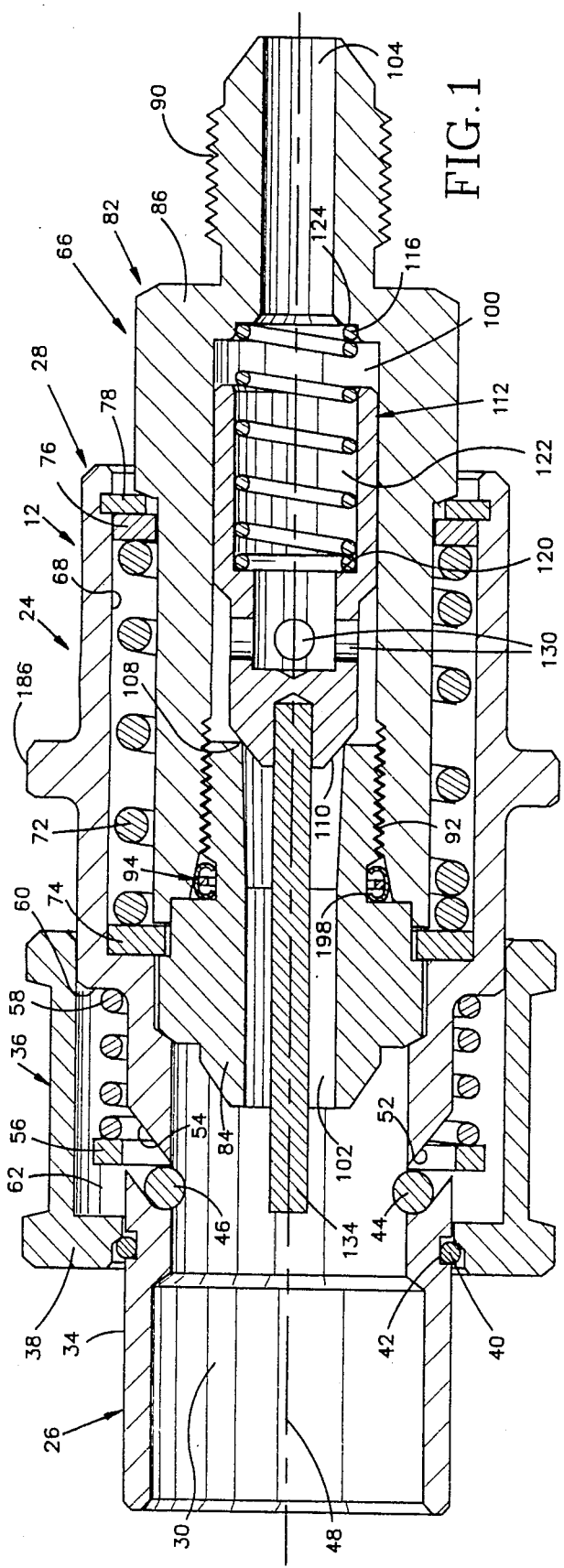
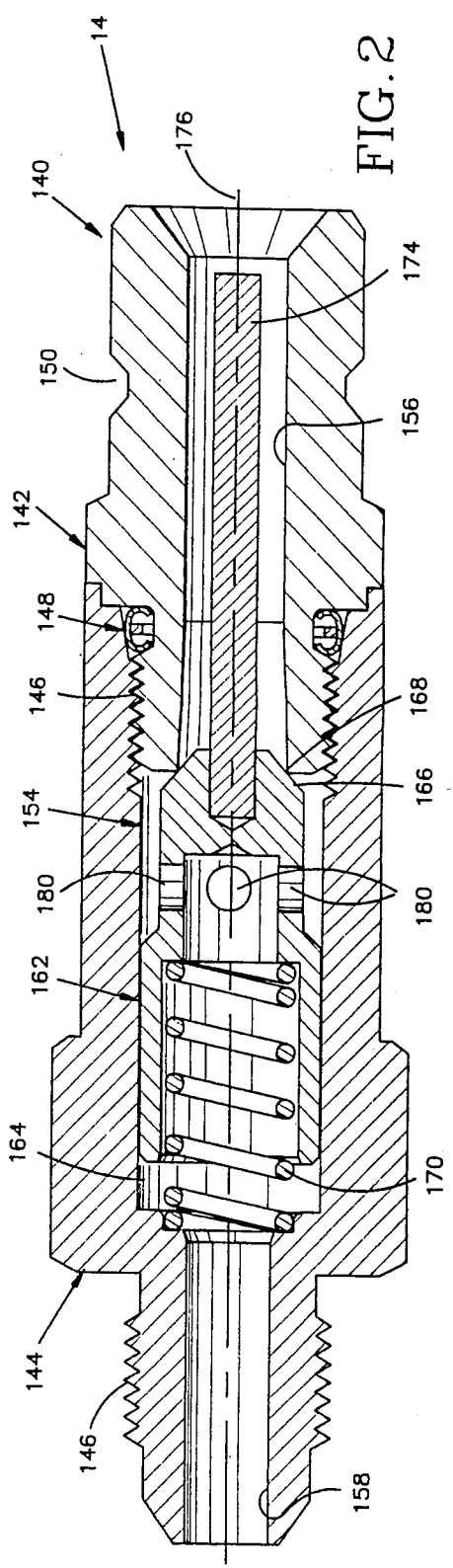
FIG. 1
FIG. 2

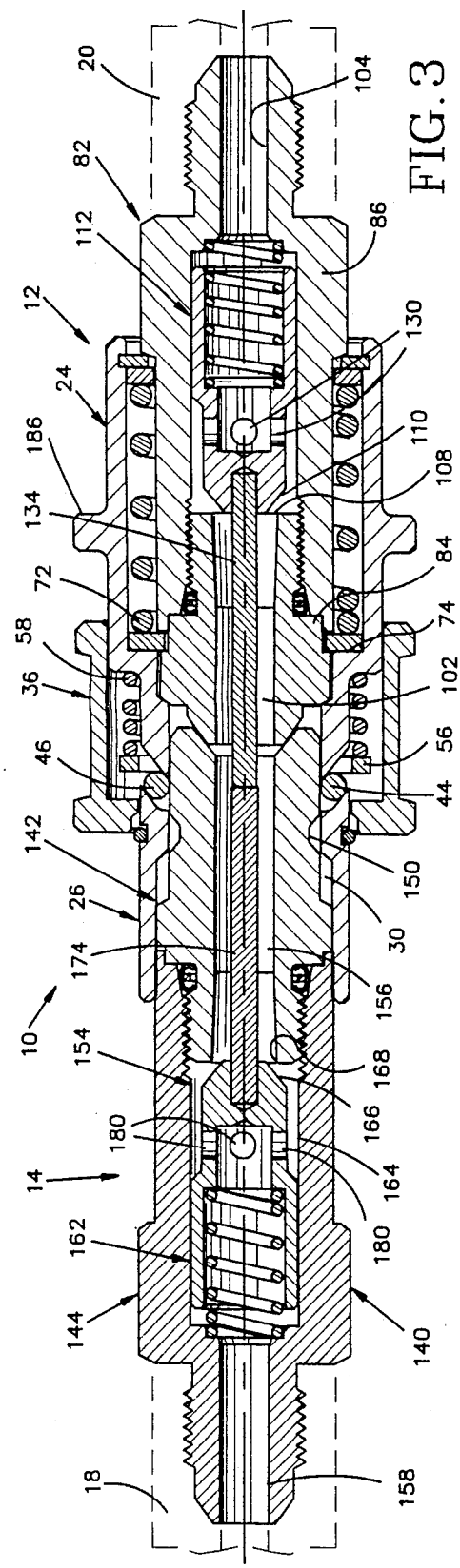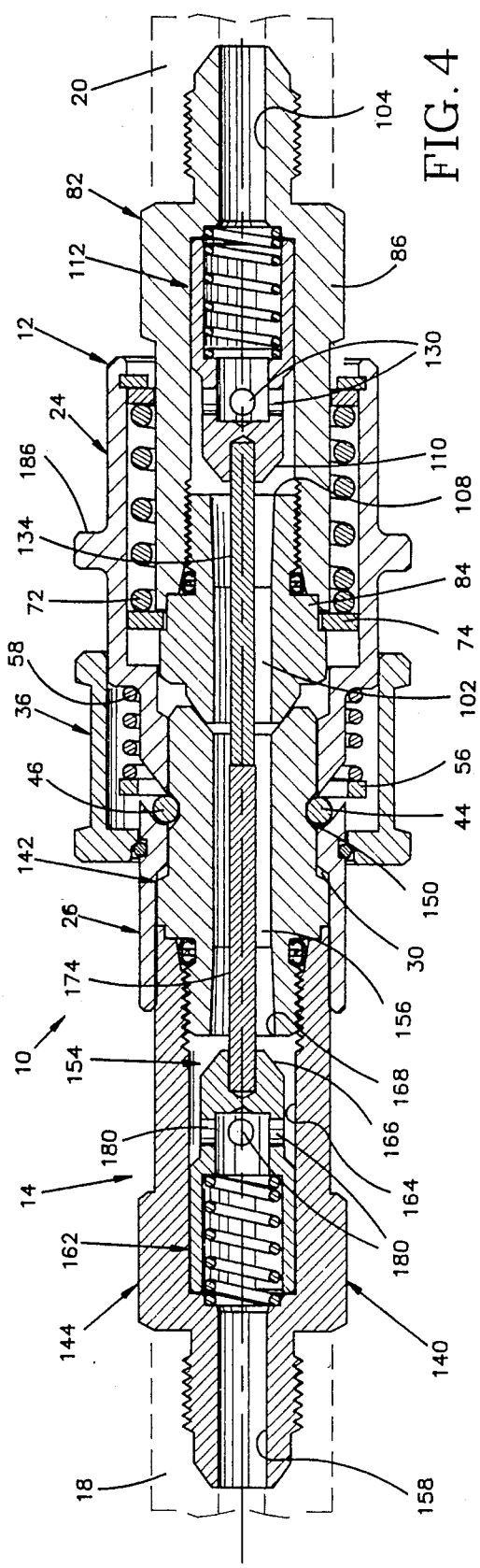

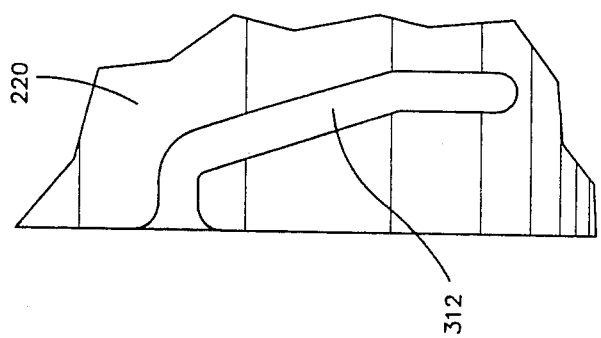
FIG. 8
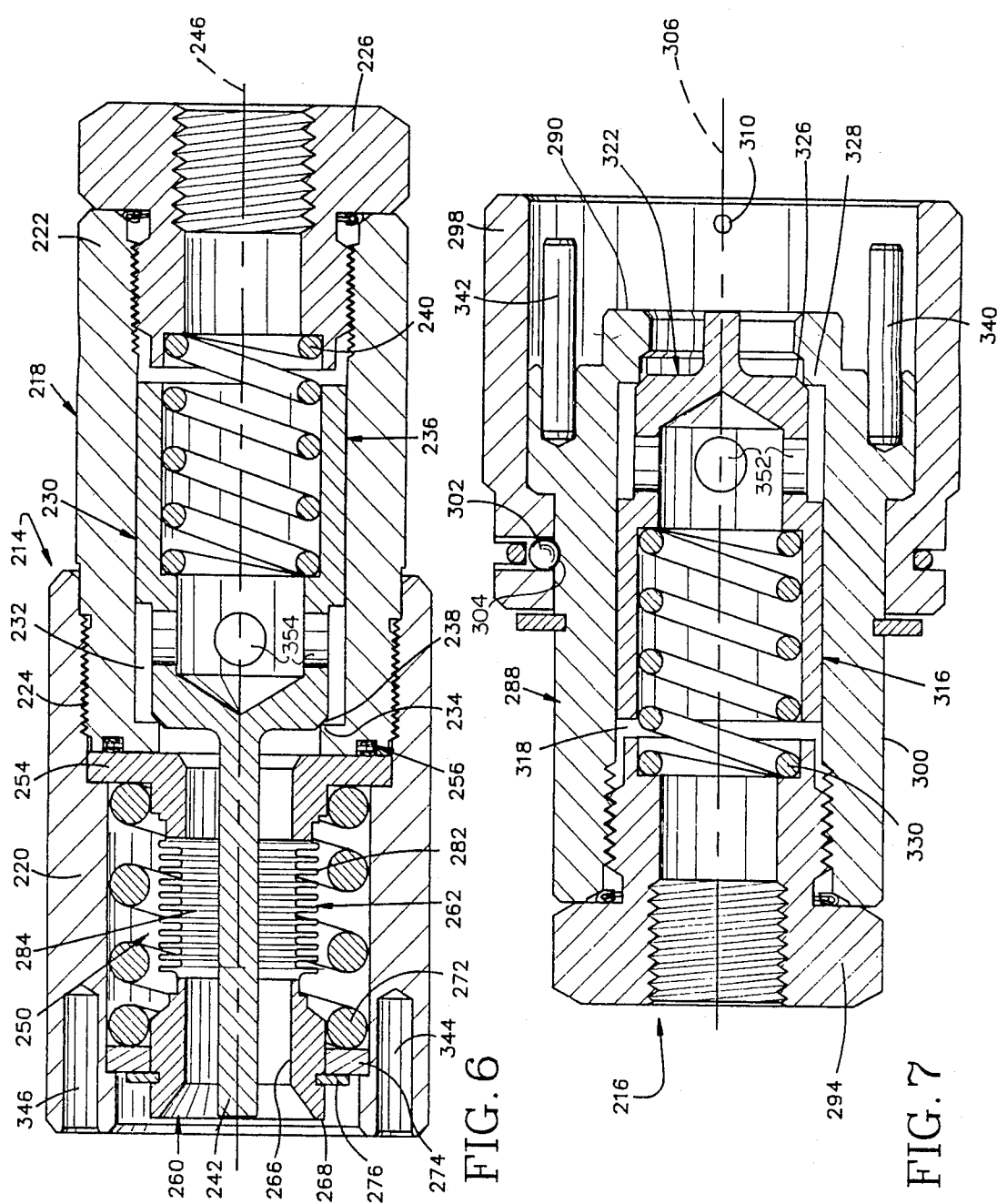
FIG. 6
FIG. 7

COUPLING ASSEMBLY

BACKGROUND OF THE INVENTION

The present invention relates to a coupling assembly for use in connecting a pair of conduits in fluid communication and more specifically to a coupling assembly which is adapted for use in a high temperature environment.

Pieces of material are commonly bonded by being subjected to high temperatures and pressures in an autoclave. When this is to be done, the materials which are to be bonded are enclosed in a flexible fluid tight container. This container is connected with a vacuum manifold through threaded connections. The time required to establish the threaded connection between the container and the vacuum manifold represents down time during which the autoclave is not being used. When a substantial number of containers have to be connected with a vacuum manifold to evacuate the containers, the down time can be substantial and will contribute substantially to the cost of operating the autoclave.

SUMMARY OF THE INVENTION

The present invention provides a new and improved coupling assembly for use in connecting a pair of conduits in fluid communication. Although it is contemplated that the coupling assembly will be used in many different environments, the coupling assembly is particularly well adapted for use in the high temperature (800 to 1,000 degrees Fahrenheit) environments associated with advanced autoclaves. To enable the coupling assembly to withstand these relatively high temperatures, the coupling assembly is formed entirely of metal and has metal seals between parts of the coupling assembly. The coupling assembly can be quickly connected and disconnected to minimize the amount of autoclave down time.

The coupling assembly includes a socket assembly having a chamber into which a plug assembly is inserted. The socket assembly includes a socket body and a socket valve assembly which is movable relative to the socket body upon insertion of the plug assembly into the socket assembly. As the plug assembly is inserted into the socket assembly, the socket valve assembly is moved and metal-to-metal seal is formed between the plug and socket assemblies.

Accordingly, it is an object of this invention to provide a new and improved coupling assembly which is adapted for use in high temperature environments.

Another object of this invention is to provide a new and improved coupling assembly which includes a plug assembly and a socket assembly and wherein a metal-to-metal seal is formed and a socket valve assembly is moved relative to a socket body as the plug assembly is inserted into the socket assembly.

BRIEF DESCRIPTION OF THE DRAWINGS

The foregoing and other objects and features of the present invention will become more apparent upon consideration of the following description taken in connection with the accompanying drawings wherein:

FIG. 1 is a sectional view of a socket assembly which forms part of a coupling assembly constructed in accordance with the present invention;

FIG. 2 is a sectional view of a plug assembly which forms another part of the coupling assembly;

FIG. 3 is a sectional view, on a reduced scale, illustrating the coupling assembly with the plug assembly partially inserted into the socket assembly;

FIG. 4 is a sectional view, generally similar to FIG. 3, illustrating the coupling assembly with the plug assembly fully inserted into the socket assembly;

FIG. 6 is a sectional view of a socket or first connector assembly used in a second embodiment of the coupling assembly;

FIG. 7 is an enlarged sectional view of a plug or second connector assembly used in the second embodiment of the coupling assembly;

FIG. 8 is an enlarged fragmentary plan view of a retainer slot formed in the connector assembly of FIG. 6 and engaged by the connector assembly of FIG. 7.

DESCRIPTION OF SPECIFIC PREFERRED EMBODIMENTS OF THE INVENTION

General Description

Figure 5:
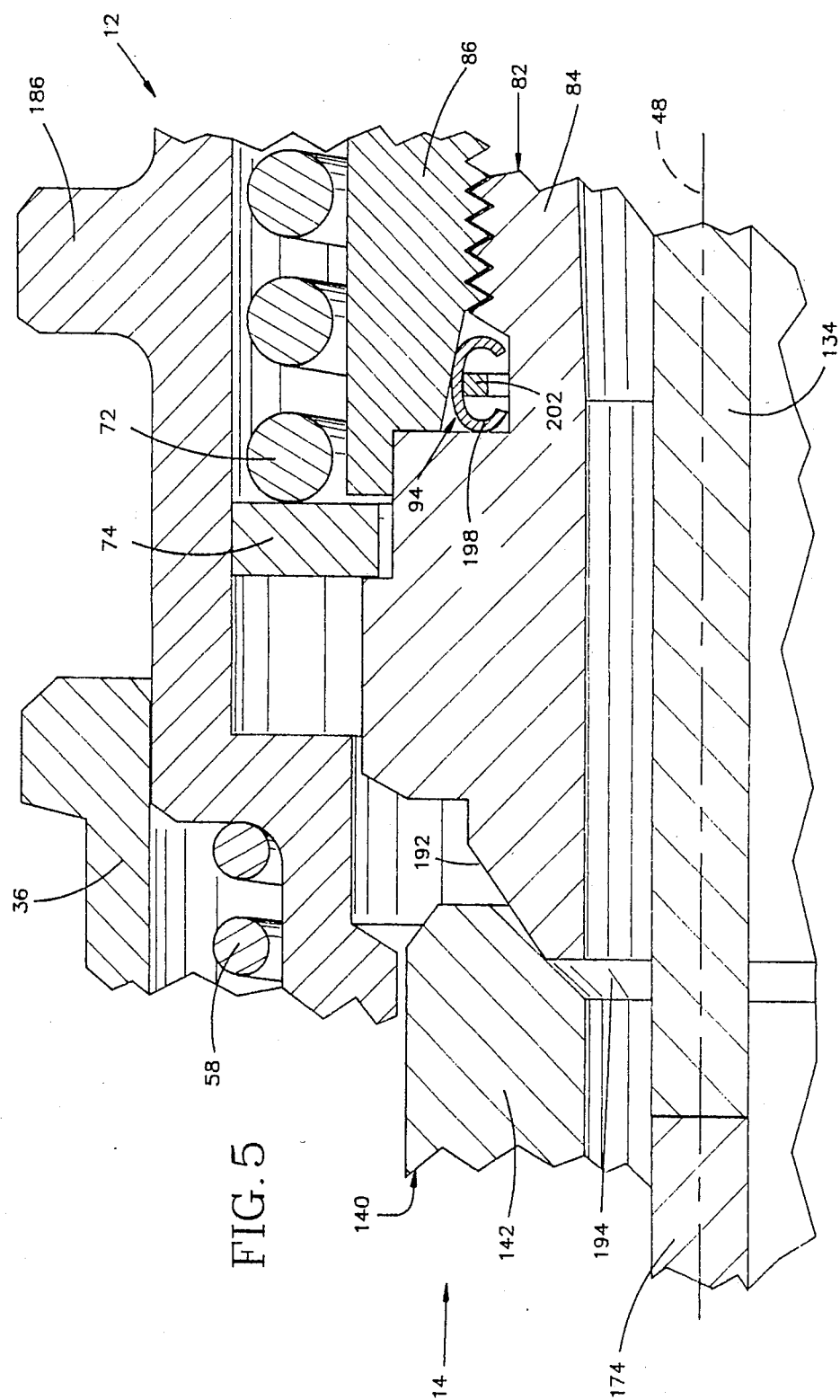
FIG. 5 is an enlarged fragmentary sectional view of a portion of FIG. 4 and illustrating the manner in which a metal-to-metal seal is formed between the leading end portion of the plug assembly and the socket assembly and illustrating the construction of a metal seal disposed between components of the socket assembly.

A coupling assembly 10 (FIGS. 3 and 4) constructed in accordance with the present invention includes a socket assembly 12 (FIG. 1) into which a plug assembly 14 (FIG. 2) is inserted to connect a pair of conduits 18 and 20 (FIGS. 3 and 4) in fluid communication with each other. Although the coupling assembly 10 could be utilized to connect many different types of conduits 18 and 20 in fluid communication with each other, the coupling assembly is advantageously used in association with an autoclave (not shown). When the coupling assembly 10 is used in association with an autoclave, the coupling assembly is used to connect a vacuum manifold or source of low pressure in fluid communication with a flexible container of materials to be subjected to high temperatures and pressures.

When the coupling assembly 10 is used with an autoclave, the conduit 18 (FIGS. 3 and 4) is connected with a flexible container of materials which are to be subjected to high temperatures and pressures in the autoclave. The conduit 20 is connected in fluid communication with a vacuum manifold, that is with a source of very low pressure. When the conduits 18 and 20 are connected in fluid communication with each other by the coupling assembly 10 in the manner shown in FIG. 4, the flexible container is evacuated and any gas in the container is drawn through the conduit 18, coupling assembly 10 and conduit 20 to the vacuum manifold or source of low pressure. Of course the conduit 20 and socket assembly 12 could be connected with the flexible container and the conduit 18 and plug assembly 14 could be connected with the vacuum manifold if desired.

In order to enable the coupling assembly 10 to withstand the extremely high temperatures to which it is exposed during operation of the autoclave, the coupling assembly is formed entirely of metal. Thus, all of the components of the socket assembly 12 (FIG. 1) and all of the components of the plug assembly 14 (FIG. 2) are metal. All of the components of the plug and socket assemblies 12 and 14 are advantageously formed of stainless steel. Portions of the socket and plug assemblies 12 and 14 which are subjected to wear are preferably made of a 440 stainless steel which is relatively hard and durable. Other components of the socket and plug assemblies 12 and 14 are preferably formed of a 303 stainless steel which is easier to machine. Although it is believed that the coupling 10 will be used in high temperature environments, specifically in association with an autoclave, it is contemplated that the coupling 10 may be used in other environments and/or in association with different types of equipment.

Socket Assembly

The socket assembly 12 (FIG. 1) includes a generally cylindrical socket body or base 24 which supports the other components of the socket assembly. The one-piece stainless steel socket body 24 includes a cylindrical leading end portion 26 and a trailing end portion 28. The leading end portion 26 is slightly smaller in diameter than the trailing end portion 28 and partially defines a cylindrical socket chamber 30 into which the plug assembly 14 is telescopically inserted (FIGS. 3 and 4) to connect the conduits 18 and 20 in fluid communication with each other.

The leading end portion 26 of the socket body 24 has a cylindrical outer side surface 34 along which a cylindrical locking sleeve 36 is axially movable. The stainless steel locking sleeve 36 is movable between an extended position illustrated in FIG. 1 and a retracted position in which an annular shoulder 38 on the locking sleeve is disposed to the right of the position shown in FIG. 1. When the locking sleeve 36 is in the extended position shown in FIG. 1, the shoulder 38 abuts a stainless steel locking ring 40 disposed in an annular groove 42 in the leading end portion 26 of the socket body 24.

When the locking sleeve 36 is in the extended position of FIG. 1, a pair of locking elements 44 and 46 extend into the socket chamber 30 and are engageable with the plug assembly 14 (FIG. 4) to hold the plug assembly in the socket chamber 30. In the illustrated embodiment of the invention, the locking elements 44 and 46 are cylindrical stainless steel pins having central axes which extend perpendicular to the longitudinal central axis 48 of the socket assembly 12. The pins 44 and 46 are disposed in slots 52 and 54 which are formed in opposite sides of the socket body 24.

When the locking elements or pins 44 and 46 are in the locking position illustrated in FIG. 1, portions of the pins extend chordally across opposite sides of the socket chamber 30. Central portions of the pins 44 and 46 project into the socket chamber 30 to enable the pins to engage the plug assembly 14 when it is inserted into the socket chamber. An annular stainless steel washer 56 abuts axially opposite ends of each of the locking elements 44 and 46.

The washer 56 is urged toward the left (as viewed in FIG. 1) by a stainless steel coil spring 58. The spring 58 extends between the washer 56 and an annular shoulder 60 disposed between the leading end portion 26 and trailing end portion 28 of the socket body 24. The spring 58 presses the washer 56 against the pins 44 and 46 to urge them toward the innermost end portions of the slots 52 and 54 when the locking sleeve is in the extended position shown in FIG. 1. In addition, the washer 56 is effective to press the pins against the flange 38 on the end of the locking sleeve 36. The coil spring 58 and washer 56 are disposed in an annular spring chamber 62 disposed between the locking sleeve 36 and leading end portion 26 of the socket body 24.

When the locking sleeve 36 is pulled rearwardly, that is toward the right as viewed in FIG. 1, against the influence of the spring 58, the force applied by the annular shoulder 38 against the locking pins 44 and 46 pulls the pins rearwardly and radially outwardly along the slots 52 and 54 to move the pins out of the socket chamber 30. As the locking pins 44 and 46 move out of the socket chamber 30, the washer 56 is moved rearwardly and the spring 58 is compressed between the washer and the shoulder 60. The manner in which the locking pins 44 and 46 cooperate with the socket body 24 and locking sleeve 36 is the same as is disclosed in U.S. Pat. No. 4,676,269 entitled Connector Assembly and issued June 30, 1987.

A socket valve assembly 66 is movably mounted in a cylindrical chamber 68 formed in the trailing end portion 28 of the socket body 24. The socket valve assembly 66 is axially movable relative to the socket body 24 between an initial position, illustrated in FIG. 1, and a withdrawn position, illustrated in FIG. 4, by insertion of the plug assembly 14 into the socket assembly 12. The socket valve assembly 66 is urged to the initial position of FIG. 1 by a stainless steel coil spring 72 which is disposed in the chamber 68 in a coaxial relationship with the socket valve assembly and the socket body 24. The left (as viewed in FIG. 1) end of the spring 72 abuttingly engages an annular stainless steel washer 74 which is connected with the socket valve assembly 66. The opposite end of the spring 72 engages a second annular stainless steel washer 76 which is held against movement relative to the socket body by an annular stainless steel retaining ring 78.

The socket valve assembly 66 includes a generally cylindrical valve body 82 which is movable in the socket body 24 against the influence of the biasing spring 72. The stainless steel valve body 82 is formed in two parts, that is a leading end portion 84 and a trailing end portion 86. The trailing end portion 86 is provided with an external thread convolution 90 to facilitate connecting the valve body 82 with a fluid conduit, such as the conduit 20 (FIGS. 3 and 4). The leading and trailing end portions 84 and 86 of the valve body 82 are interconnected at a threaded connection 92 (FIG. 1). A metal seal assembly 94 is provided between the leading and trailing end portions 84 and 86 of the valve body 82.

The valve body 82 of the socket valve assembly 66 defines a cylindrical valve chamber 100. The valve chamber 100 is connected in fluid communication with a cylindrical passage 102 in the leading end portion 84 of the valve body 82 and a cylindrical passage 104 in the trailing end portion 86 of the valve body. The passages 102 and 104, valve chamber 100, spring chamber 68 and socket chamber 30 have a common central axis 48.

A circular valve seat 108 is disposed at one end of the chamber 100 and is engaged by a frustoconical end surface 110 on a stainless steel socket valve member 112. The circular valve seat 108 is formed at a corner on the leading end portion 84 of the valve body 82. Therefore, there is a relatively small area, almost a circular line, of contact between the surface 110 on the leading end of the valve member 112 and the valve seat 108. Due to the very small area of contact between the valve seat 108 and valve member 112, there is a large sealing pressure at their area of engagement. This sealing pressure results from the biasing force applied against the socket valve member 112 by a stainless steel coil spring 116.

The helical coil spring 116 extends between an annular shoulder 120 disposed in a chamber 122 in the valve member 112 and a shoulder 124 on the valve body 82. The coil spring 116 is coaxial with the valve member 112 and passage 104. Fluid can flow between the passage 104 and the valve seat 108 through the valve spring 116 and radially extending passages 130 formed in the valve member 112.

A stainless steel actuator rod or pin 134 extends from the socket valve member 112 through the passage 102 into the socket chamber 30. The cylindrical actuator rod 134 is disposed in a coaxial relationship with the valve member 112 and passages 102 and 104 in the valve body 82. When the plug assembly 14 (FIG. 2) is inserted into the socket chamber 30, force is applied against the actuator rod 134 to move the socket valve member 112 from the closed position shown in FIG. 1 to the open position shown in FIGS. 3 and 4.

Plug Assembly

The plug assembly 14 (FIG. 2) includes a generally cylindrical stainless steel plug body 140. The plug body 140 has a leading end portion 142 which is adapted to be inserted into the socket chamber 30. The plug body 140 also has a trailing end portion 144 having an external thread convolution 146 to facilitate connection with a fluid conduit, such as the fluid conduit 18 (FIGS. 3 and 4). The leading and trailing end portions 142 and 144 are interconnected by threads 146. A metal seal assembly 148, having the same general construction as the seal assembly 94 of FIG. 1, is provided between the leading and trailing end portions 142 and 144 of the plug body 140. The trailing end portion 144 of the plug body is identical to the trailing end portion 86 of the socket body (FIG. 1). This facilitates manufacture of the plug and socket assemblies 12 and 14 since the same component can be used in both the plug and socket assembly, thereby reducing the number of parts which must be maintained in inventory.

The leading end portion 142 of the plug body 140 is provided with an annular locking recess 150 which is engageable by the locking pins 44 and 46 of the socket assembly 12 (FIG. 1) when the plug assembly 14 is inserted into the socket assembly (Fig. 4). Thus, when the plug assembly 14 is inserted into the socket assembly 12 and the locking pins 44 and 46 return to the locking or retaining position shown in FIG. 1, portions of the locking pins 44 and 46 will engage the annular groove 150 in the plug body 140 to hold the plug body in the socket chamber 30. When the locking sleeve 36 is pulled rearwardly (rightwardly as viewed in FIG. 1) against the influence of the biasing spring 58, the locking pins 44 and 46 will be moved out of engagement with the annular recess 150 in the plug body 140 to release the plug assembly 14 for withdrawal from the socket assembly 12.

A plug valve assembly 154 (FIG. 2) is disposed in the plug body 140. The plug valve assembly 154 is operable between a closed condition (FIG. 2) and an open condition (FIGS. 3 and 4). When the plug valve assembly 154 is in the closed condition (FIG. 2) it blocks fluid communication between a cylindrical passage 156 formed in the leading end portion 142 of the plug body 140 ( and a cylindrical passage 158 formed in the trailing end portion 144 of the plug body. When the plug valve assembly 154 is in the open condition (FIGS. 3 and 4), fluid can flow between the passages 156 and 158 through the plug valve assembly.

The plug valve assembly 154 includes a generally cylindrical valve member 162 (FIG. 2) disposed in a cylindrical chamber in the plug body 140. The stainless steel valve member 162 has a frustoconical leading end surface 166 which engages a circular valve seat 168 when the plug valve member 162 is in the closed position of FIG. 2. The valve seat 168 makes circular line contact with the leading end surface 166 of the valve member 162. This enables a stainless steel coil spring 170 to press the valve member 162 against the valve seat 168 with a force which results in a relatively large sealing pressure between the valve member and valve seat. The plug valve member 162 is identical to the socket valve member 112. This facilitates manufacture of the plug and socket assemblies 12 and 14 by enabling the same part to be used as either a socket valve member 112 or a plug valve member 162.

A cylindrical stainless steel actuator rod or pin 174 is connected with the valve member 62 and extends into the passage 156. The rod 174, passage 156, valve chamber 164 and passage 158 all have a common central axis 176. The actuator rod 174 is effective to transmit force to the valve member 162 to move the valve member from the closed position shown in FIG. 2 to the open position shown in FIGS. 3 and 4 to thereby operate the plug valve assembly 154 from a closed condition to an open condition. When the plug valve assembly is in an open condition, fluid can flow through radially extending circular passages 180 in the valve member 162.

Operation

When the plug and socket assemblies 12 and 14 are to be interconnected, the locking sleeve 36 is gripped in one hand and the trailing end portion 144 of the plug assembly 14 is manually gripped in the other hand. The leading end portion 142 of the plug assembly 14 is then inserted into the socket chamber 30. As the plug assembly 14 enters the socket chamber, the leading end portion 142 of the plug assembly forces the locking pins 44 and 46 radially outwardly against the influence of the biasing spring 58. This moves the locking pins 44 and 46 from the locking position of FIG. 1 to the retracted position of FIG. 3.

As the plug assembly 14 continues to be inserted into the socket assembly 12, the valve actuator rods or pins 134 and 174 abuttingly engage each other and move the socket and plug valve members 112 and 162 from the closed positions of FIGS. 1 and 2 to the open positions of FIG. 3. In addition, the leading end portion 142 of the plug body 140 sealingly engages the leading end portion 84 of the valve body 82. As this is occurring, the socket valve body 82 remains stationary relative to the socket body 24.

Continued movement of the plug assembly 14 into the socket assembly 12 presses the leading end portion 142 of the plug body 140 against the leading end portion 84 of the socket valve body 82. This establishes a metal-to-metal seal between the plug body 140 and socket valve body 82. The socket valve body 82 is moved rearwardly from the initial position shown in FIGS. 1 and 3 to the withdrawn position shown in FIG. 4. As this occurs, the socket chamber 30 into which the plug assembly 14 is inserted increases in length.

As the socket valve body 82 moves relative to the socket body 24 from the initial position shown in FIG. 3 to the withdrawn position shown in FIG. 4, the biasing spring 72 is effective to apply force against the leading end portion 84 of the socket valve body. This force maintains a fluid tight, metal-to-metal seal between the leading end portion 84 of the socket valve body 82 and the leading end portion 142 of the plug body. When the locking pins 44 and 46 have engaged the annular groove 150 in the plug body 140 (FIG. 4), the plug assembly 14 is securely locked in the socket chamber 30 by the locking pins.

Once the plug and socket assemblies 12 and 14 have been interconnected in the manner shown in FIG. 4, fluid can flow through the coupling assembly between the conduits 18 and 20. Thus, through the plug assembly 14, there is a fluid passage which extends from the conduit 18 through the passage 158 in the trailing end portion 144 of the plug body, through the circular openings 180 in the plug valve member 162 to the passage 156 in the leading end portion 142 of the plug body 140. Through the socket assembly 12, there is a fluid passage which extends from the conduit 20 through the passage 104 in the trailing end portion 86 of the socket valve body 82, through the circular openings 130 in the socket valve member 112 to the passage 102 in the leading end portion 84 of the socket valve body 82.

When the socket and plug assemblies 12 and 14 are to be released, the locking sleeve 36 on the socket body 24 is held in one hand and the plug body 140 is held in the other hand. The locking sleeve 36 is pulled rearwardly (toward the right as viewed in FIG. 4) to move the locking pins 44 and 46 to their disengaged positions. The socket valve body spring 72 then moves the socket valve body 82 from the position shown in FIG. 4 to the position shown in FIG. 3. As this occurs, the plug assembly 14 is moved from the position shown in FIG. 4 to the position shown in FIG. 3.

Continued withdrawal of the plug assembly 14 from the socket assembly 12 moves the leading end portion 142 of the plug body 140 out of engagement with the leading end portion 84 of the socket valve body 82. This opens the metal-to-metal seal between the socket valve body 82 and the plug body 140. In addition, the socket and plug valve members 112, 154 move from their open condition (FIG. 3) to their closed condition (FIGS. 1 and 2) to block fluid flow through the socket and plug assemblies 12 and 14.

Seals

There are two different types of metal-to-metal seals in the coupling assembly 10. Thus, a first metal-to-metal seal is formed by abutting engagement of the leading end portion 84 of the socket body 82 with the leading end portion 142 of the plug body 140 when the plug and socket assemblies 12 and 14 are interconnected (FIG. 4). A second metal-to-metal seal is formed by the seal assemblies 94 (FIG. 1) and 148 (FIG. 2) between components of the socket valve body 82 and plug body 140.

The metal-to-metal seal between the leading end portion 84 of the socket valve body 82 and the leading end portion 142 of the plug body 140 is formed by engagement of a frustoconical surface 192 (FIG. 5) on the leading end portion 84 of the socket valve body 82 with a frustoconical surface 194 on the inside of the leading end portion 142 of the plug body 140. The frustoconical surfaces 192 and 194 have different included angles so that there is substantially line contact between the two surfaces. Thus, the included angle of the frustoconical surface 192 on the outside of the leading end portion 84 of the socket valve body 82 is slightly smaller than the included angle of the frustoconical surface 194 on the inside of the leading end portion 142 of the plug body 140.

Due to the different included angles of the frustoconical surfaces 192 and 194, there is circular line contact between the socket valve body 82 and plug body 140 when the coupling assembly 10 is in the connected condition of FIG. 4. Since there is substantially line contact between the socket valve body 82 and plug body 140, the force exerted by the socket valve body spring 72 (FIGS. 1 and 4) is effective to press the socket valve body 82 firmly against the plug body 140 to obtain a fluid tight seal. Silver plating is provided on the end surface 194 of the plug body 140 to provide a slightly yieldable seal surface which is engageable by the socket valve body 82.

The metal-to-metal seal assembly 94 includes an annular seal ring or member 198 (FIG. 5) having a central axis which is coincident with the central axis 48 of the socket assembly 12 (FIG. 1). The seal member 198 (FIG. 5) has a generally C-shaped cross sectional configuration in a radial plane. The C-shaped seal ring 198 opens radially inwardly toward the central axis 48 of the socket assembly.

An arcuate outer side surface of the seal ring 198 engages the leading and trailing end portions 84 and 86 of the socket valve body 82 to prevent a leakage of fluid between the leading and trailing end portions 84 and 86 of the socket valve body. An annular locating or positioning ring 202 is disposed in the seal member 198 to retain the seal member 198 on the leading end portion 84 of the socket valve body 82 during construction of the socket assembly 12. Although only the seal assembly 94 is illustrated in FIG. 5, it should be understood that the seal assembly 148 (FIG. 2) has substantially the same construction as the seal assembly 94.

Second Embodiment of the Invention

In the coupling assembly 10 illustrated in FIGS. 1-4, the socket and plug valve assemblies 112 and 154 open slightly before sealing engagement occurs between the end portion 84 of the socket valve body 82 and the leading end portion 142 of the plug body 140. This results in a slight leakage of fluid during the brief period of time when the plug and socket assemblies 12 and 14 are being interconnected. Although it is believed that this slight leakage will not be objectionable under most circumstances, it may be objectionable under certain circumstances. Therefore, in the embodiment of the invention illustrated in FIGS. 6-9, a fluid tight seal is formed between components of a coupling assembly before valves in the components are opened.

A coupling assembly 212 (FIG. 9) includes a socket or first connector assembly 214 and a plug or second connector assembly 216 which are used to connect a pair of conduits (not shown) in fluid communication. The coupling assembly 212 is formed of stainless steel and heat resistant nickel base alloy. Therefore, the coupling assembly 212 can withstand relatively high temperatures and is particularly well suited for use in association with a high temperature autoclave where the temperatures may range between 800 and 1,000 degrees Fahrenheit.

When the coupling assembly 212 is used in association with an autoclave, it is contemplated that the socket or first connector assembly 214 (FIG. 6) will be connected with a fluid conduit leading to vacuum or source of low pressure. The plug or second connector assembly 216 (FIG. 7) would be connected with a flexible container of materials to be subjected to high temperatures and pressures in the autoclave. Although the coupling assembly 212 is particularly well suited for use in the high temperature environments associated with an autoclave, it is contemplated that the coupling assembly may be used in other environments in association with different types of devices.

The socket or first connector assembly 214 (FIG. 6) includes a generally cylindrical stainless steel socket body or base 218 having a leading end portion 220 which is connected with a trailing end portion 222 at a threaded connection 224. A stainless steel adapter 226 is connected with the trailing end portion 222 and has internal threads for connection with a conduit.

A valve assembly 230 is disposed in a cylindrical valve chamber 232 formed in the trailing end portion 222 of the socket body 218. The valve assembly 230 is operable between a closed condition (FIG. 6) blocking fluid flow through the socket assembly 214 and an open condition (FIG. 9) in which fluid can flow through the socket assembly. The valve assembly 230 includes an annular valve seat 234 formed by the stainless steel trailing end portion 222 of the socket body 218.

A generally cylindrical stainless steel valve member 236 has a frustoconical end surface 238 which is pressed against the valve seat 234 by a stainless steel coil spring 240. The valve seat 234 has circular line contact with the valve surface 238 so that there is a relatively large sealing pressure between the surface 238 and valve seat 234. A cylindrical stainless steel actuator rod 242 is formed as one piece with and extends axially outwardly from the valve member 236. The actuator rod 242, valve member 236 and coil spring 240 are coaxial with a longitudinal central axis 246 of the socket assembly 214.

In accordance with a feature of this embodiment of the invention, the socket assembly 214 includes an all metal seal assembly 250 for sealingly engaging the plug assembly 216. The seal assembly 250 includes an annular stainless steel base 254 which is fixedly secured between the leading and trailing end portions 220 and 222 of the socket body 218. An all metal seal assembly 256, having the same general construction as the seal assemblies 94 and 148 of the embodiment of the invention shown in FIGS. 1-5, is provided between the trailing end portion 222 of the socket body 218 and the base 254.

A generally cylindrical stainless steel seal member 260 is connected with the base 254 by a bellows 262 formed of a nickel-chrome alloy, such as "Inconel" (Trademark). The seal member 260 has a cylindrical passage 266 through which the actuator rod 242 extends. A flat annular leading end surface 268 of the seal member 260 is engageable with the plug assembly 216 upon interconnection of the socket and plug assemblies 214 and 216.

The seal member 260 is biased toward the forward end of the socket body 218 by a stainless steel coil spring 272. The spring 272 is disposed between the base 254 and an annular stainless steel washer 274. A stainless steel retaining ring 276 transmits force from the washer 274 to the seal member 260 to press the leading end surface 268 of the seal member against the plug assembly 216 (FIG. 7) under the influence of the biasing spring 272.

The bellows 262 (FIG. 6) include a flexible nickel-chrome alloy wall 282 having an annular cross sectional configuration. The wall 282 is coaxial with the longitudinal central axis 246 of the socket assembly 214 and with the seal member 260. The flexible wall 282 has a variable length central passage 284.

Figure 9:
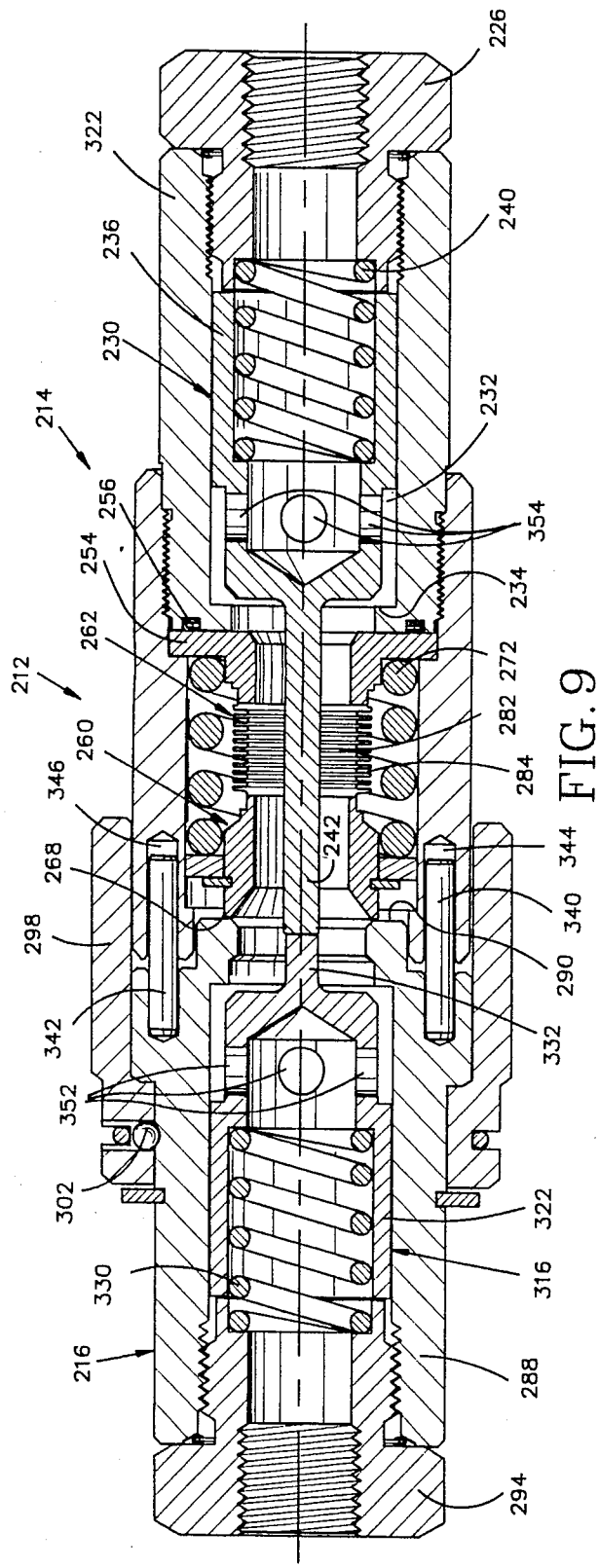
FIG. 9 is a sectional view of the coupling assembly with the connector assemblies of FIGS. 6 and 7 interconnected.

Upon connection of the socket assembly 214 with the plug assembly 216, the seal member 260 moves inwardly, that is toward the right as viewed in FIG. 6, against the influence of the biasing spring 272. This results in the flexible wall 282 being resiliently deflected and axially compressed as the socket and plug assemblies 214 and 216 are interconnected (FIG. 9). The seal member 260 extends slightly past the outer end of the actuator rod 242. Therefore, the seal member 260 will engage the plug assembly 216 before the actuator rod 242 is moved to operate the valve assembly 230 from the closed condition of FIG. 6 to the open condition of FIG. 9.

The all metal plug assembly 216 includes a stainless steel plug body 288 having a flat annular leading end surface 290 which is sealingly engaged by the leading end surface 268 on the seal member 260 (FIG. 6) of the socket assembly 214 when the socket and plug assemblies 214 and 216 are interconnected (FIG. 9). A stainless steel adapter member 294 (FIG. 7) is connected with the trailing end of the plug body 288 and is adapted to be connected with a fluid conduit.

A generally cylindrical stainless steel locking sleeve 298 (FIG. 7) is rotatably mounted on a cylindrical outer side surface 300 of the plug body 288. A spherical stainless steel retaining element 302 extends inwardly from the stainless steel sleeve 298 into a detent or recess 304 formed in the stainless steel plug body 300. The retaining element 302 cooperates with the recess 304 to releasably retain the locking sleeve 298 against rotational movement about a central axis 306 of the plug assembly.

The locking sleeve 298 is provided with a cylindrical radially inwardly extending stainless steel retaining pin 310 which is engageable with and cooperates with a locking or retaining track 312 (FIG. 8) formed in the leading end 220 of the socket body 218 when the socket and plug assemblies 214 and 216 are interconnected. Engagement of the locking pin 310 with the track 312 holds the socket and plug assemblies 214 and 216 in interconnected (FIG. 9). To release the socket and plug assemblies 214 and 216, the locking sleeve 298 is rotated about the coincident central axes 246 and 306 of the socket and plug assemblies. Although only one locking pin 310 and track 312 is shown in FIGS. 7 and 8, it is preferred to use a pair of locking pins and tracks on diametrically opposite sides of the locking sleeve 298 and socket body 218.

A plug valve assembly 316 (FIG. 7) is disposed in a cylindrical chamber 318 formed in the plug body 288. The plug valve assembly 316 includes a generally cylindrical stainless steel plug valve member 322. The plug valve member 322 is disposed in the valve chamber 318 and has a central axis which is coincident with the central axis of the plug body 288. The plug valve member 322 has a frustoconical outer end surface 326 which engages a valve seat 328 formed on the plug body 288. The plug valve member 322 is biased toward the closed condition shown in FIG. 7 under the influence of a stainless steel coil spring 330.

A cylindrical stainless steel actuator rod 332 is integrally formed with the plug valve member 322 and extends axially outwardly from the plug valve member. The actuator rod 332 has an end surface which is disposed slightly inwardly, that is toward the left (as viewed in FIG. 7) of the annular seal surface 290 which is engaged by the seal member 260 when the socket and plug assemblies 214 and 216 are interconnected. Therefore, before the plug valve assembly 316 and the socket valve assembly 230 can be operated to their open conditions, the seal member 260 in the socket assembly 214 must sealingly engage the end surface 290 on the plug body 288 and the flexible bellows 262 must be slightly compressed before the valve assemblies 230 and 316 are opened.

When the socket and plug assemblies 214 and 216 are to be interconnected in the manner shown in FIG. 9, a pair of cylindrical stainless steel alignment pins 340 and 342 on the plug body 288 are aligned with a pair of cylindrical openings 344 and 346 in the socket body 218. In addition, the locking pin 310 is aligned with the open end of the locking track 312 (FIG. 8) formed in the leading end portion 220 of the socket body 218. The plug and socket assemblies 214 and 216 are then moved axially toward each other.

As the plug and socket assemblies 214 and 216 move together, the locking sleeve 298 of the plug assembly is rotated to move the locking pin 310 along the track 312. This provides a camming action to press the socket and plug assemblies 214 and 216 together. As the plug and socket assemblies are pressed together, the flat annular leading end surface 268 on the seal member 260 of the socket assembly 214 engages the flat annular leading end surface 290 on the socket body 288 to form a fluid tight metal-to-metal seal. As this is occurring, the bellows 262 is resiliently compressed axially through a short distance.

As the bellows 262 is initially compressed, the leading end of the socket valve actuator rod 242 engages the leading end of the plug valve actuator rod 332. Continued axial movement of the socket and plug assemblies 214 and 216 toward each other results in the socket valve assembly 230 and plug and valve assembly 316 being operated from the closed condition of FIGS. 6 and 7 to the open condition of FIG. 9. This enables fluid to flow through radially extending circular passages 352 in the plug valve member 332 and through radially extending circular passages 354 in the socket valve member 236. Fluid can flow between the openings 352 and 354 in the valve members 236 and 322 through the central passage 284 in the bellows 262.

Conclusion

The present invention provides a new and improved coupling assembly 10 for use in connecting a pair of conduits 18, 20 in fluid communication. Although it is contemplated that the coupling assembly 10 will be used in many different environments, the coupling assembly is particularly well adapted for use in the high temperature (800 to 1,000 degrees Fahrenheit) environments associated with autoclaves. To enable the coupling assembly 10 to withstand these relatively high temperatures, the coupling assembly is formed entirely of metal and has metal seals between parts of the coupling assembly. The coupling assembly can be quickly connected and disconnected to minimize the amount of autoclave down time.

The coupling assembly 10 includes a socket assembly 12 having a chamber 30 into which a plug assembly 14 is inserted. The socket assembly 12 includes a socket body 24 and a socket valve assembly 66 which is movable relative to the socket body upon insertion of the plug assembly 14 into the socket assembly. As the plug assembly 14 is inserted into the socket assembly 12, the socket valve assembly 66 is moved and a metal-to-metal seal is formed between the plug and socket assemblies 12 and 14.

Having described specific preferred embodiments of the invention, the following is claimed:

1. A coupling assembly for use in connecting a pair of conduits in fluid communication, said coupling assembly comprising a plug assembly, said plug assembly including a plug body having a leading end portion and a trailing end portion adapted to be connected with one of the conduits, a plug valve assembly disposed in said plug body, said plug valve assembly being operable between a closed condition blocking fluid flow through said plug body and an open condition in which said plug valve assembly is ineffective to block fluid flow through said plug body, and a socket assembly having a socket chamber which receives said leading end portion of said plug body, said socket assembly including a socket body in which said socket chamber is at least partially disposed, a movable locking element disposed on said socket body, said locking element being movable between a disengaged condition and an engaged condition in which said locking element is engageable with said plug body to hold said plug body against movement relative to said socket body, a locking sleeve extending around and movable relative to an outer side surface of said socket body, said locking sleeve being movable relative to the outer side surface of said socket body between a first position in which said locking element is in the engaged condition and a second position in which said locking element is in the disengaged condition, a socket valve assembly at least partially disposed in and movable relative to said socket body, said socket valve assembly including a socket valve body having an outer end portion adapted to be connected with one of the conduits and in inner end portion disposed in said socket body, said socket valve body being movable relative to said socket body between first and second positions, socket valve body spring means for urging said socket valve body toward the first position, a socket valve member disposed in said socket valve body, a socket valve seat disposed in said socket valve body, said socket valve member being movable relative to said socket valve body between an open position in which said socket valve member is spaced from said socket valve seat and a closed position in which said socket valve member is disposed in engagement with said socket valve seat, and socket valve spring means disposed in said socket valve body for urging said socket valve member toward its closed position, said leading end portion of said plug body including surface means for applying force against said inner end portion of said socket valve body to move said socket valve body relative to said socket body from the first position to the second position against the influence of said socket valve body spring means and to form a fluid tight seal between said leading end portion of said plug body and said inner end portion of said socket valve body during insertion of said leading end portion of said plug body into said socket chamber, said plug and socket valve assemblies including means for operating said plug valve assembly from the closed condition to the open condition during insertion of said leading end portion of said plug body into said socket chamber and for moving said socket valve member from its closed position to its open position during insertion of said leading end portion of said plug body into said socket chamber.

2. A coupling assembly as set forth in claim 1 wherein said socket assembly includes metal seal means for sealingly engaging components of said socket assembly.

3. A coupling assembly as set forth in claim 2 wherein said plug assembly and said socket assembly are both formed entirely of metal to enable said plug assembly and said socket assembly to conduct fluids at high temperatures.

4. A coupling assembly as set forth in claim 1 wherein said inner end portion of said socket valve body at least partially defines said socket chamber, said socket body including surface means for defining a socket chamber opening through which said leading end portion of said plug body is inserted into said socket chamber, said socket valve body being movable away from the socket chamber opening to increase the length of said socket chamber as said socket valve body moves from the first position to the second position.

5. A coupling assembly as set forth in claim 1 wherein said plug valve assembly includes a plug valve member disposed in said plug body, a plug valve seat disposed in said plug body, said plug valve member being movable relative to said plug body between an open position in which said plug valve member is spaced from said plug valve seat and said plug valve assembly is in the open condition and a closed position in which said plug valve member is disposed in engagement with said plug valve seat and said plug valve assembly is in the closed condition, and plug valve spring means for urging said plug valve member toward its closed position.

6. A coupling assembly as set forth in claim 5 wherein said means for operating said plug valve assembly from the closed condition to the open condition and for moving said socket valve member from its closed position to its open position during insertion of said leading end portion of said plug body into said socket chamber includes a first actuator element connected with said plug valve member and a second actuator element connected with said socket valve member, said first actuator element transmitting force to move said plug valve member from its closed position to its open position during insertion of said leading end portion of said lug body into said socket chamber, said second actuator element transmitting force to move said socket valve member from its closed position to its open position during insertion of said leading end portion of said plug body into said socket chamber.

7. A coupling assembly as set forth in claim 5 wherein said plug valve member is disposed in said trailing end portion of said plug body and said socket valve member is disposed in said outer end portion of said socket valve body, said trailing end portion of said plug body and said outer end portion of said socket valve body having the same configuration.

8. A coupling assembly as set forth in claim 7 wherein said plug valve member and said socket valve member have the same configuration.

9. A coupling assembly as set forth in claim 1 further including seal means disposed between said inner and outer end portions of said socket valve body, said seal means including an annular metal seal member having a generally C-shaped radial cross sectional configuration and an annular metal washer having a circular rim portion disposed in said seal member.

10. A coupling assembly formed entirely of metal for use in connecting a pair of conduits in fluid communication, said coupling assembly comprising a plug assembly formed entirely of metal, said plug assembly including a plug body having a leading end portion and a trailing end portion adapted to be connected with one of the conduits, a plug valve assembly disposed in said plug body, said plug valve assembly being operable between a closed condition blocking fluid flow through said plug body and an open condition in which said plug valve assembly is ineffective to block fluid flow through said plug body, and a socket assembly formed entirely of metal and having a socket chamber which receives said leading end portion of said plug body, said socket assembly including a socket body in which said socket chamber is at least partially disposed, a movable locking element disposed on said socket body, said locking element being movable between a disengaged condition and an engaged condition in which said locking element is engageable with said plug body to hold said plug body against movement relative to said socket body, a locking sleeve extending around and movable relative to an outer side surface of said socket body, said locking sleeve being movable relative to the outer surface of said socket body between a first position in which said locking element is in the engaged condition and a second position in which said locking element is in the disengaged condition, a socket valve assembly at least partially disposed in and movable relative to said socket body, said socket valve assembly including a socket valve body having an outer end portion adapted to be connected with one of the conduits and an inner end portion disposed in said socket body, said socket valve body being movable relative to said socket body between first and second positions, socket valve body spring means for urging said socket valve body toward the first position, a socket valve member disposed in said socket valve body, a socket valve seat disposed in said socket valve body, said socket valve member being movable relative to said socket valve body between an open position in which said socket valve member is spaced from said socket valve seat and a closed position in which said socket valve member is disposed in engagement with said socket valve seat, and socket valve spring means disposed in said socket valve body for urging said socket valve member toward its closed position, said leading end portion of said plug body including surface means for applying force against said inner end portion of said socket valve body to move said socket valve body and plug body together relative to said socket body to move said socket valve body from the first position to the second position against the influence of said socket valve body spring means and to form a fluid tight seal between said leading end portion of said plug body and said inner end portion of said socket valve body during insertion of said leading end portion of said plug body into said socket chamber, said socket valve body being movable relative to said socket body to increase the extent of said socket chamber as said plug body is inserted into said socket chamber, said plug and socket valve assemblies including means for operating said plug valve assembly from the closed condition to the open condition during insertion of said leading end portion of said plug body into said socket chamber and for moving said socket valve member from its closed position to its open position during insertion of said leading end portion of said plug body into said socket chamber.

11. A coupling assembly for use in connecting a pair of conduits in fluid communication, said coupling assembly comprising first and second connector assemblies and means for interconnecting said connector assemblies, said first connector assembly including a first connector body having a leading end portion and a trailing end portion adapted to be connected with one of the conduits, said first connector assembly having a first valve assembly disposed in said first connector body, said first valve assembly being operable between a closed condition blocking fluid flow through said first connector body and an open condition in which said first valve assembly is ineffective to block fluid flow through said first connector body, said second connector assembly including a second connector body having a leading end portion and a trailing end portion adapted to be connected with the other one of the conduits, said second connector assembly having a second valve assembly disposed in said second connector body, said second valve assembly being operable between a closed condition blocking fluid flow through said second connector body and an open condition in which said second valve assembly is ineffective to block fluid flow through said second connector body, said first and second valve assemblies including actuator means for operating said first and second valve assemblies from their closed conditions to their open conditions as said connector assemblies are interconnected, one of said connector assemblies including seal means for sealingly engaging the other one of said connector assemblies as said connector assemblies are interconnected, said seal means including surface means for engaging the leading end portion of said connector body of said other connector assembly and bellows connected with said surface means and said connector body of said one connector assembly, said bellows including a flexible wall means defining an axially extending central opening, said flexible wall means being resiliently deflected and axially compressed as said connector assemblies are interconnected, said actuator means extending through said flexible wall means of said bellows to effect operation of said first and second valve assemblies from their closed conditions to their open conditions as said connector assemblies are interconnected.

* * * * *

UNITED STATES PATENT AND TRADEMARK OFFICE
CERTIFICATE OF CORRECTION

PATENT NO.   : 4,799,512

DATED        : January 24, 1989

INVENTOR(S)  : Charles R. Sarson

It is certified that error appears in the above-identified patent and that said Letters Patent is hereby corrected as shown below:

Column 13, Line 42, change "lug" to --plug--

Signed and Sealed this

Twenty-seventh Day of March, 1990

Attest:

JEFFREY M. SAMUELS

Attesting Officer

Acting Commissioner of Patents and Trademarks